US 8,824,866 B1

(12) United States Patent
Milner

(10) Patent No.: US 8,824,866 B1
(45) Date of Patent: Sep. 2, 2014

(54) STORAGE EMULATION CONTROL

(75) Inventor: Simon Milner, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 1579 days.

(21) Appl. No.: 12/163,294

(22) Filed: Jun. 27, 2008

Related U.S. Application Data

(60) Provisional application No. 60/946,558, filed on Jun. 27, 2007.

(51) Int. Cl.
*H04N 5/76* (2006.01)
*H04N 5/85* (2006.01)
*G11B 27/10* (2006.01)

(52) U.S. Cl.
CPC . *H04N 5/85* (2013.01); *H04N 5/76* (2013.01); *G11B 27/105* (2013.01)
USPC .......................................... 386/295; 386/248

(58) Field of Classification Search
USPC ......................................................... 386/248
See application file for complete search history.

(56) References Cited

U.S. PATENT DOCUMENTS

| 2006/0212922 | A1* | 9/2006 | Laksono | 725/151 |
| 2007/0058924 | A1* | 3/2007 | Yeh | 386/46 |
| 2007/0245024 | A1* | 10/2007 | Prus et al. | 709/226 |
| 2009/0019510 | A1* | 1/2009 | Duflot | 725/131 |

FOREIGN PATENT DOCUMENTS

WO   WO 2005067289  A1 *   7/2005

\* cited by examiner

*Primary Examiner* — Vu Le
*Assistant Examiner* — Tracy Mangialaschi

(57) ABSTRACT

Storage emulation control is described. In embodiment(s), a logical storage media can be emulated to a video processor of a video processing device where the logical storage media includes at least an internal storage media and an external storage media of the video processing device. A video processor command to initiate recording of video content on the logical storage media can be received, and the video processor command can then be arbitrated to record the video content on at least one of the internal storage media and the external storage media.

24 Claims, 9 Drawing Sheets

STORAGE EMULATION CONTROL

RELATED APPLICATION

This application claims priority to U.S. Provisional Patent Application Ser. No. 60/946,558 filed Jun. 27, 2007, entitled "Hard-Disk-Drive Emulation Mode for Personal Video Recorder Storage Expansion" to Milner, the disclosure of which is incorporated by reference herein in its entirety.

BACKGROUND

A television set-top box can receive video content, such as television programming and on-demand movies from a content distributor. The set-top box can then record the video content and/or process the video content for display on a display device, such as a television, LCD, or other type of video display device. A television set-top box can include a hard drive to record the television programming and other video content, and may be referred to as a "personal video recorder" (PVR) or a "digital video recorder" (DVR). With the advent of high-definition video, a traditional set-top box is limited to recording about one-quarter of the video content that it would have been able to record as standard-definition video because the video data for a high-definition program consumes approximately four- to five-times more storage space than the video data for the same program in a standard-definition format.

A single hard drive in a television set-top box has a limited capacity to store recorded video content. If a viewer wants to record additional video content, an external storage drive or hard drive may be connected to a television set-top box to expand the video content storage capacity. A traditional television set-top box can have expansion ports, such as for a USB, Ethernet, and/or an external serial ATA (SATA) connection. However, external drives can be unreliable and are implemented with protocols that may cause a system failure (e.g., "crash") of a television set-top box, such as when an external drive is disconnected. For example, an internal hard drive of a television set-top box may be at capacity, which may then initiate the set-top box to write additional video content to an external drive to record the video content. In an event that the external drive is unplugged or disconnected when performing a write operation, however, the operating system of the television set-top box may fail or crash.

SUMMARY

This summary introduces concepts of storage emulation control that are further described below in the Detailed Description. Accordingly, the summary should not be considered to identify essential features nor used to limit the scope of the claimed subject matter.

In embodiment(s) of storage emulation control, a method is implemented to emulate a logical storage media to a video processor of a video processing device where the logical storage media includes at least an internal storage media and an external storage media of the video processing device. A video processor command is received to initiate recording of video content on the logical storage media, and the video processor command is arbitrated to record the video content on at least one of the internal storage media and the external storage media.

In other embodiment(s), a storage emulation control system includes a storage emulation controller and a logical storage media that includes at least an internal storage media and an external storage media of a video processing device. The storage emulation controller can emulate the logical storage media to a video processor of the video processing device; receive a video processor command to initiate recording of video content on the logical storage media; and arbitrate the video processor command to record the video content on at least one of the internal storage media and the external storage media.

In other embodiment(s), a video processing device includes a video processor, a storage emulation controller, and an internal storage media to record video content. The video processor can initiate a video processor command to record the video content on the internal storage media. The storage emulation controller can emulate a logical storage media to the video processor where the logical storage media includes at least the internal storage media and an external storage media; receive the video processor command to initiate recording of the video content; and arbitrate the video processor command to record the video content on at least one of the internal storage media and the external storage media.

In other embodiment(s), computer-readable media comprises computer-executable instructions that, when executed, implement a storage emulation controller to emulate a logical storage media to a video processor of a video processing device, the logical storage media including at least an internal storage media and an external storage media of the video processing device; receive a video processor command to initiate recording of video content on the logical storage media; and arbitrate the video processor command to record the video content on at least one of the internal storage media and the external storage media.

BRIEF DESCRIPTION OF THE DRAWINGS

Embodiments of storage emulation control are described with reference to the following drawings. The same numbers are used throughout the drawings to reference like features and components.

DETAILED DESCRIPTION

Embodiments of storage emulation control provide storage media expandability for a video processing and/or recording device while a storage emulation controller emulates a single, logical storage media to a video processor of the video processing and/or recording device. A logical storage media can include an internal storage media of a video processing device and/or any number of external storage media that are networked to the video processing device. A video processing and/or recording device (referred to herein as a "video processing device") may also be referred to as a personal video recorder (PVR) or a digital video recorder (DVR).

A storage emulation controller provides for stable networking and management control of external storage media without causing an operating system or other control application of a video processing device to fail. The storage emulation controller also provides for seamless integration to add networked storage media, and offloads the indexing and networking functions for a video processing device. In addition, the storage emulation controller can be implemented in a video processing device with only minimal control messaging extensions to the existing system software architecture of the device.

In one or more embodiments, a storage emulation controller can be implemented as a SATA Target Mode Emulator that is coupled to the video processing subsystem of a video consumer electronics system or device. The SATA Target Mode Emulator provides for system integration to expand the storage capability of a video processing device. Video consumer electronics systems or devices can include a media device, a high definition television (HDTV), television set-top box, digital video recorder (DVR), and/or any other type of media device that can process and/or record video content. In addition, a SATA Target Mode Emulator can be integrated in a system-on-chip (SoC) with an embedded processor to provide storage expansion functions, such as for a RAID system, a backup or archive system, and/or for virtualization.

While features and concepts of the described systems and methods for storage emulation control can be implemented in any number of different environments, systems, networks, and/or various configurations, embodiments of storage emulation control are described in the context of the following example networks and environments.

Figure 1:
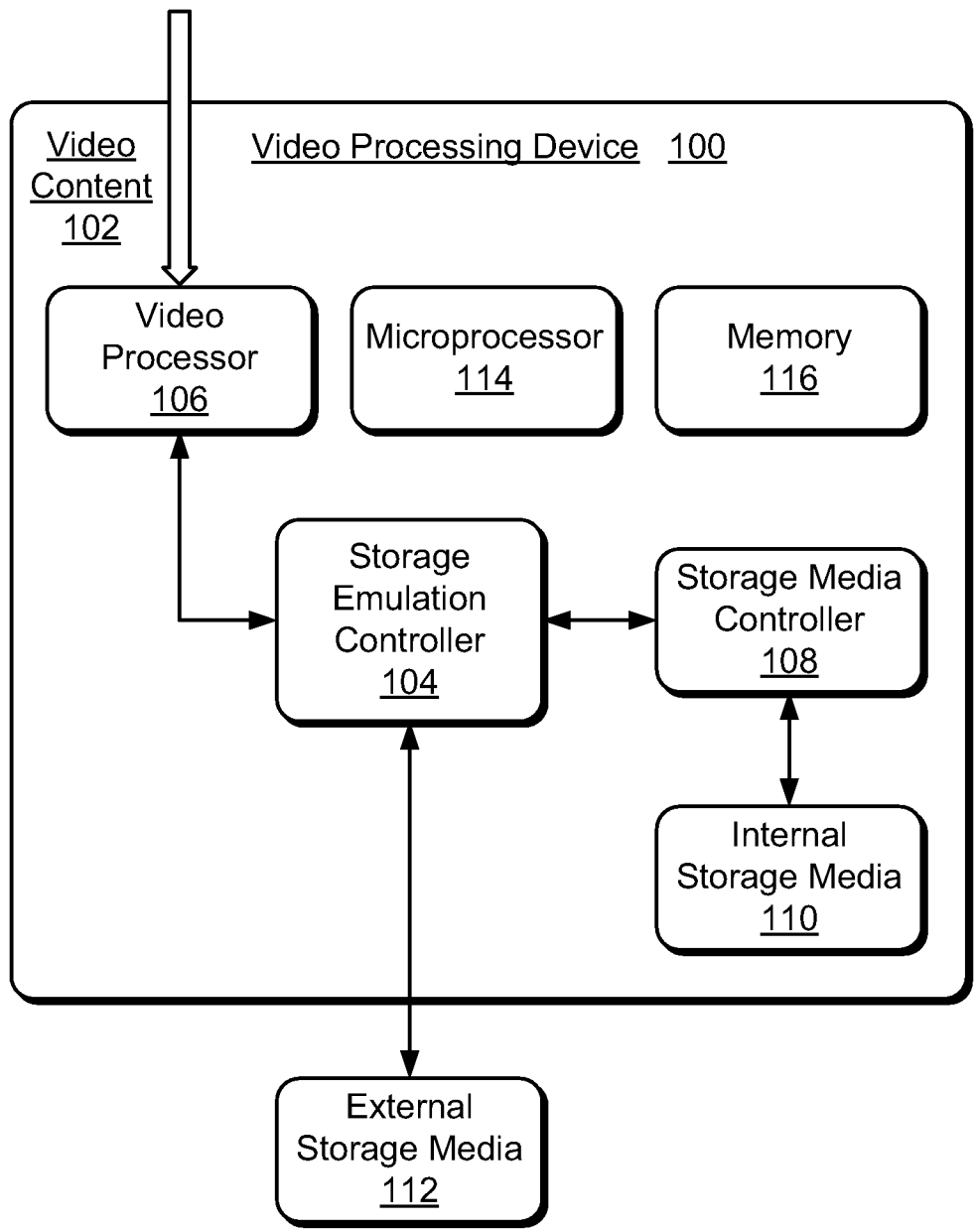
FIG. 1 illustrates an example video processing device in which embodiments of storage emulation control can be implemented.

FIG. 1 illustrates an example of a video processing device 100 in which embodiments of storage emulation control can be implemented. The video processing device 100 is an example of a television set-top box that can receive video content 102, such as television programming and on-demand movies from a content distributor. The video processing device 100 can then initiate recording the video content when it is received and/or render the video content for display on a display device, such as a television, LCD, HDTV, or other video display device.

The video processing device 100 includes a storage emulation controller 104, a video processor 106, and a storage media controller 108 that manages recording the video content on an internal storage media 110. In one or more embodiments, the storage emulation controller 104 can be implemented as an interface, or logical abstraction layer, between the video processor 106 and the storage media controller 108 to record the video content on the internal storage media 110. As an interface, the storage emulation controller 104 emulates a logical storage media to the video processor 106. In various embodiments, the logical storage media can include the internal storage media 110 and/or any number of external storage devices, such as external storage media 112.

The storage emulation controller 104 appears as a single, media storage drive (e.g., a virtualized logical drive) to the video processor 106 when implemented in-line between the video processor 106 and the storage media controller 108. The storage emulation controller 104 can receive video processor commands from the video processor 106, decode the video processor commands, and emulate the commands to the internal storage media 110 and/or to the external storage media 112.

With the storage emulation controller 104, additional storage drives can be reliably connected to the video processing device 100 without changing the software that operates to control the device. In one or more embodiments, the storage emulation controller 104 can be implemented to manage external storage media devices that are networked to the video processing device 100. The storage emulation controller 104 can also then emulate the networked external storage media devices to the video processor 106 as part of the logical storage media.

The video processor 106 can initiate video processor commands to initiate recording video content that is received on the internal storage media 110. The storage emulation controller 104 can then receive and arbitrate the video processor commands to record the video content on one of the internal storage media 110 or the external storage media 112. For example, the storage emulation controller 104 can receive video processor commands to initiate recording the video content, determine that the internal storage media 110 is at capacity, and record the video content on the external storage media 112, which is part of the logical storage media as emulated to the video processor 106.

The internal storage media 110 and/or the external storage media 112 can be implemented as various types of storage media to include, but not limited to, random access memory (RAM), a disk drive, a recordable and/or rewriteable disc, and/or as any other type of storage media. In this example, the video processing device 100 also includes a microprocessor 114 (e.g., any of a microcontroller, digital signal processor, etc.) and a memory 116, which can be any type computer-readable media, such as random access memory (RAM), a low-latency nonvolatile memory (e.g., flash memory), read only memory (ROM), and/or other suitable electronic data storage. The memory 116 can include an operating system and/or other software that operates to control the video processing device 100 when executed by the microprocessor 114.

The arrowed connections shown in the example video processing device 100 (and in each of the FIGS. 1-4 and 8-10) are merely exemplary to depict the communication links and/or connections between the various components, functions, and/or modules of a device or system. It is contemplated that any one or more of the arrowed communication links facilitate two-way data communication, such as between the storage emulation controller 104 and the video processor 106.

Figure 2:
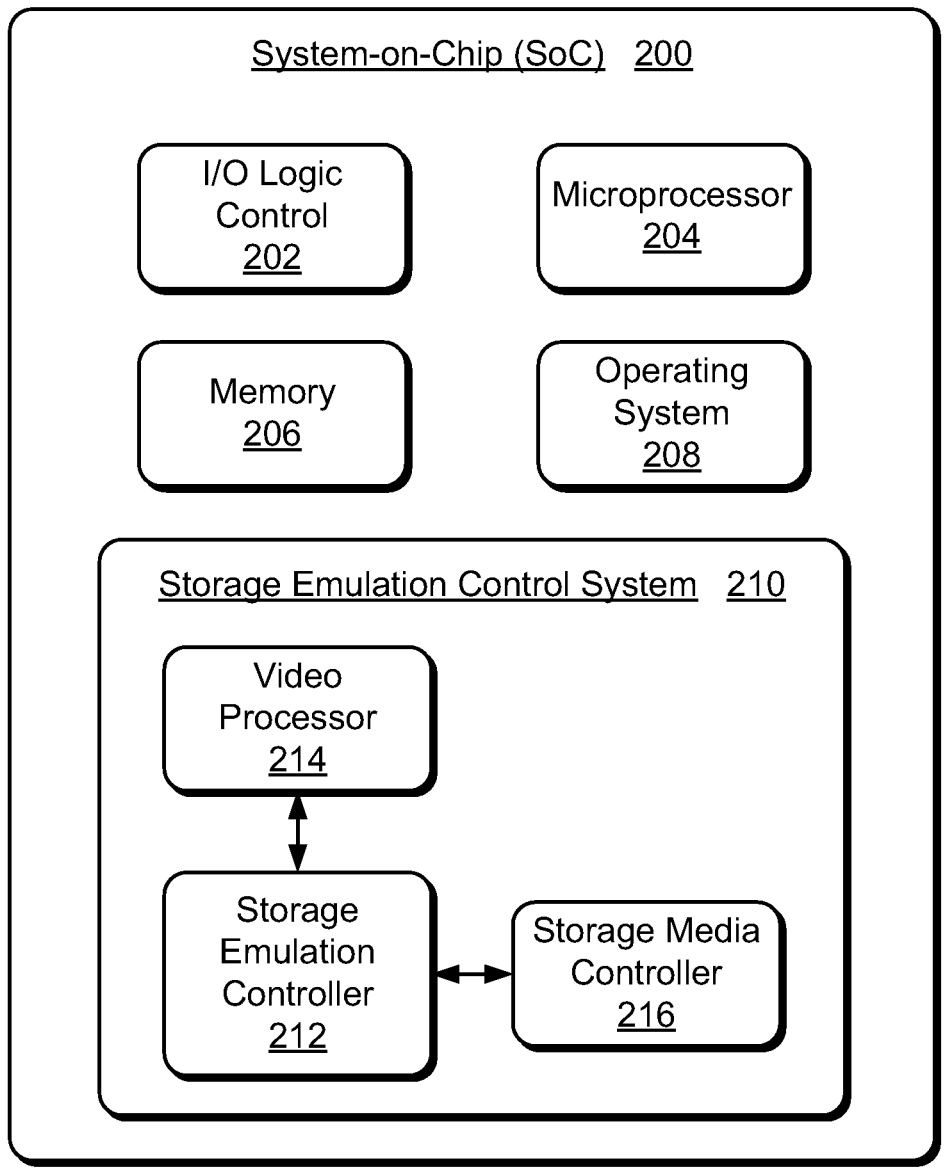
FIG. 2 illustrates an example system-on-chip (SoC) environment in which embodiments of storage emulation control can be implemented.

FIG. 2 illustrates an example system-on-chip (SoC) 200, which can implement various embodiments of storage emulation control in any type of a consumer electronic device. An SoC can be implemented in a fixed or mobile device, such as any one or combination of a media device, computer device, telephone (e.g., cellular, VoIP, WiFi, etc.), high definition television (HDTV), television set-top box, video processing device, appliance device, gaming device, electronic device, digital camera, GPS navigation device, vehicle, workstation, access point, and/or in any other type of device.

The SoC 200 can be integrated with electronic circuitry, a microprocessor, memory, input-output (I/O) logic control, communication interfaces and components, other hardware, firmware, and/or software needed to run an entire device. The SoC 200 can also include an integrated data bus that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 200 can also be implemented with any number and combination of differing components as further described with reference to the example device shown in FIG. 7.

In this example, SoC 200 includes various components such as an input-output (I/O) logic control 202 (e.g., to include electronic circuitry, generally) and a microprocessor 204 (e.g., any of a microcontroller, digital signal processor, etc.). The SoC 200 also includes a memory 206 which can be any type of random access memory (RAM), a low-latency nonvolatile memory (e.g., flash memory), read only memory (ROM), and/or other suitable electronic data storage. The SoC 200 can also include various firmware and/or software, such as an operating system 208 which can be computer-executable instructions maintained by memory 206 and executed by microprocessor 204. The SoC 200 can also include other various communication interfaces and components, wireless LAN (WLAN) components, other hardware, firmware, and/or software.

In this example, SoC 200 includes a storage emulation control system 210 which can implement various embodiments of storage emulation control. The storage emulation control system 210 includes a storage emulation controller 212, a video processor 214, and a storage media controller 216. Examples of these components and their corresponding functionality are described with reference to the respective storage emulation controller 104, video processor 106, and storage media controller 108 shown in FIG. 1.

The components of the storage emulation control system 210 in SoC 200, either independently or in combination, can be implemented as computer-executable instructions maintained by memory 206 and executed by microprocessor 204 to implement various embodiments and/or features of storage emulation control. The storage emulation control system 210, as well as other functionality described to implement embodiments of storage emulation control, can also be provided as a service apart from SoC 200. Alternatively and/or in addition, the storage emulation control system 210 can be implemented as hardware, firmware, fixed logic circuitry, or any combination thereof that is implemented in connection with the I/O logic control 202 and/or other signal processing and control circuits of SoC 200.

In one or more embodiments, the storage emulation controller 212 can be implemented as a SATA Target Mode Emulator that is coupled to the video processing subsystem of a video consumer electronics system or device. The SATA Target Mode Emulator provides a technique for system integration to expand the storage capability of a personal video recorder (PVR). Video consumer electronics systems or devices can include, but are not limited to, a media device, computer device, high definition television (HDTV), television set-top box, video processing device, digital video recorder (DVR), appliance device, gaming device, electronic device, vehicle, workstation, access point, and/or in any other type of media device that can process and/or record video content. In addition, a SATA Target Mode Emulator (e.g., the storage emulation controller 212 in an embodiment) can be integrated in the SoC 200 with an embedded processor to provide storage expansion functions, such as for a RAID system, a backup or archive system, and/or for virtualization. The storage emulation controller 212 can also provide for seamless integration to add networked storage media, and to offload the indexing and networking functions for a consumer electronics system or device, such as a personal video recorder (PVR), a digital video recorder (DVR), or other video processing device.

Figure 3:
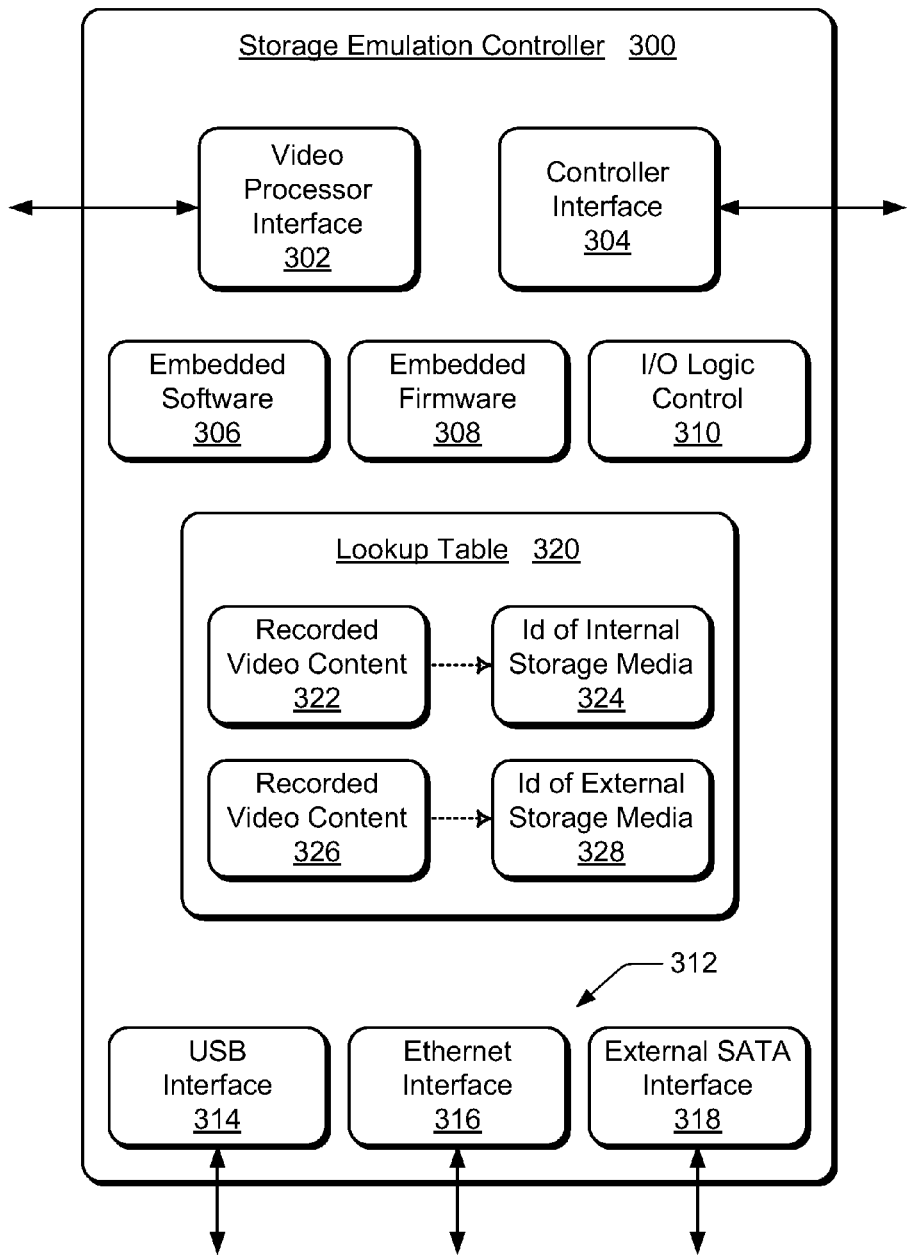
FIG. 3 illustrates an example storage emulation controller that can implement embodiments of storage emulation control.

FIG. 3 illustrates an example of a storage emulation controller 300 that can implement various embodiments of storage emulation control. In various embodiments, the storage emulation controller 300 can be implemented as any one of the storage emulation controller 104 or storage emulation controller 212 shown in respective FIGS. 1 and 2. In this example, the storage emulation controller 300 includes a video processor interface 302 to interface with a video processor, and includes a controller interface 304 to interface with a storage media controller of a video processing device.

The storage emulation controller 300 can also include embedded software 306, embedded firmware 308, and/or other input-output (I/O) logic control 310 that can, independently or in combination, implement a transport protocol layer, and control the operational aspects, emulation functions, and video content routing of the storage emulation controller 300. The storage emulation controller 300 can also include various data communication interfaces 312 to include, but not limited to, a USB interface 314, an Ethernet interface 316, and/or an external SATA interface 318 for networked external storage devices.

The storage emulation controller 300 also includes a lookup table 320 (also referred to as a "translation table") to track and correlate where video content is recorded. For example, the lookup table 320 can correlate recorded video content 322 with an identifier 324 of an internal storage media in a video processing device if the video content is recorded on the internal storage media. Similarly, the lookup table 320 can correlate recorded video content 326 with an identifier 328 of an external storage media that is coupled to the video processing device if the video content is recorded on the external storage media.

When implemented as an SATA Target Mode Emulator (such as described with reference to storage emulation controller 212 shown in FIG. 2), the storage emulation controller 300 can receive video processor commands as serial ATA (SATA) commands via the video processor interface 302 to initiate recording video content on a storage media. The storage emulation controller 300 can decode control fields of the SATA commands, and change the control fields to redirect the video content for recording on an internal storage media or an external storage media. For example, the storage emulation controller 300 can receive video processor commands to initiate recording video content on an internal storage media, decode the commands to redirect the video content, and record the video content on an external storage media.

The lookup table 320 also serves to facilitate retrieval of recorded video content from a particular storage media when requested. For example, the storage emulation controller 300 can receive a video processor request for video content that is recorded on a logical storage media (e.g., an internal storage media and/or any number of external storage media), and then determine that the requested video content is recorded on an internal storage media or an external storage media from the lookup table 320.

Figure 4:
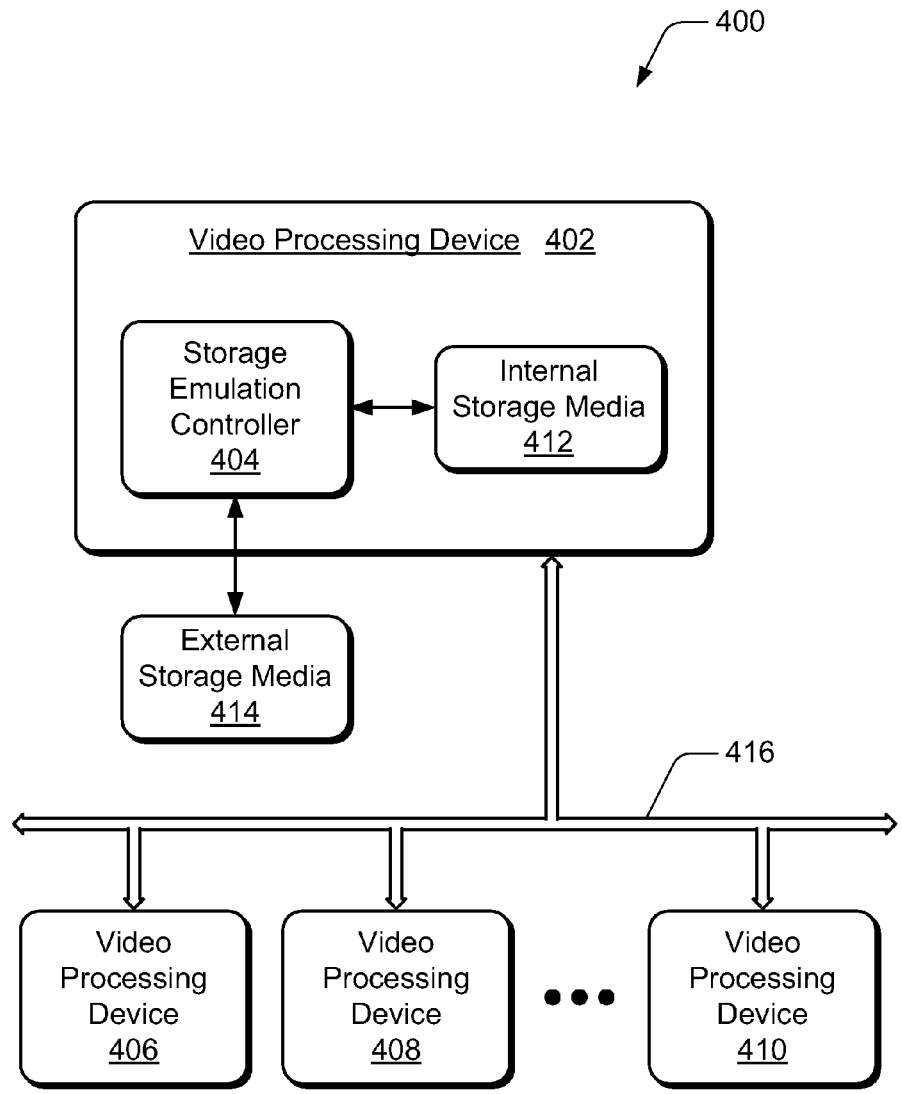
FIG. 4 illustrates an example networked environment of video processing devices and storage devices in which embodiments of storage emulation control can be implemented.

FIG. 4 illustrates an example of a networked environment 400 that includes video processing devices in which embodiments of storage emulation control can be implemented. A video processing device 402 includes a storage emulation controller 404 that, in various embodiments, can implement any of the functions and/or features as described with reference to any of the storage emulation controllers 104, 212, and 300 described with reference to respective FIGS. 1, 2, and 3. In this example, the networked environment 400 may represent a household that includes several networked video processing devices, such as in a family room (device 402), a bedroom (device 406), the kitchen (device 408), and another household location (device 410).

The video processing device 402 includes an internal storage media 412, and the networked environment 400 can include any number of external storage devices (i.e., external to a video processing device), such as external storage media 414. The video processing devices and the external storage media 414 are networked for data communication via a shared network 416 (e.g., Ethernet). In this example, the storage emulation controller 404 emulates a logical storage media to a video processor in the video processing device 402, and also emulates the logical storage media to the additional video processing devices that are networked with the video processing device 402. In various embodiments, the logical storage media can include the internal storage media 412 of the video processing device 402, and/or can include any number of external storage devices, such as external storage media 414, such that the logical storage media is shared across the several networked video processing devices.

In one or more embodiments, the storage emulation controller 404 can then manage and initiate recording video content for any of the video processing devices. The storage emulation controller 404 can also initiate the distribution of recorded video content to any of the video processing devices that process the video content for display on respective display devices. In this configuration, the additional video processing devices 406, 408 and 410 that are networked with video processing device 402 may be less expensive devices (also referred to as "thin clients") that have limited functionality and resources, while the one video processing device 402 includes a storage emulation control system to manage video content for all of the networked video processing devices.

In other embodiments of the networked environment 400, the storage emulation controller 404 can provide storage expandability, such as for a RAID system, a backup or archive system, and/or for virtualization. The storage emulation controller 404 can provide for seamless integration to add networked storage media, and to offload the indexing and networking functions for the video processing device 402. In addition, the storage emulation controller 404 can be implemented in the video processing device 402 with only minimal control messaging extensions to the existing system software architecture of the device.

Example methods 500 and 600 are described with reference to respective FIGS. 5 and 6 in accordance with one or more embodiments of storage emulation control. Generally, any of the functions, methods, procedures, components, and modules described herein can be implemented using hardware (e.g., fixed logic circuitry), software, firmware, manual processing, or any combination thereof. A software implementation of a function, method, procedure, component, or module represents program code that performs specified tasks when executed on a computing-based processor. Example methods 500 and 600 may be described in the general context of computer-executable instructions. Generally, computer-executable instructions can include software, applications, routines, programs, objects, components, data structures, procedures, modules, functions, and the like.

Figure 5:
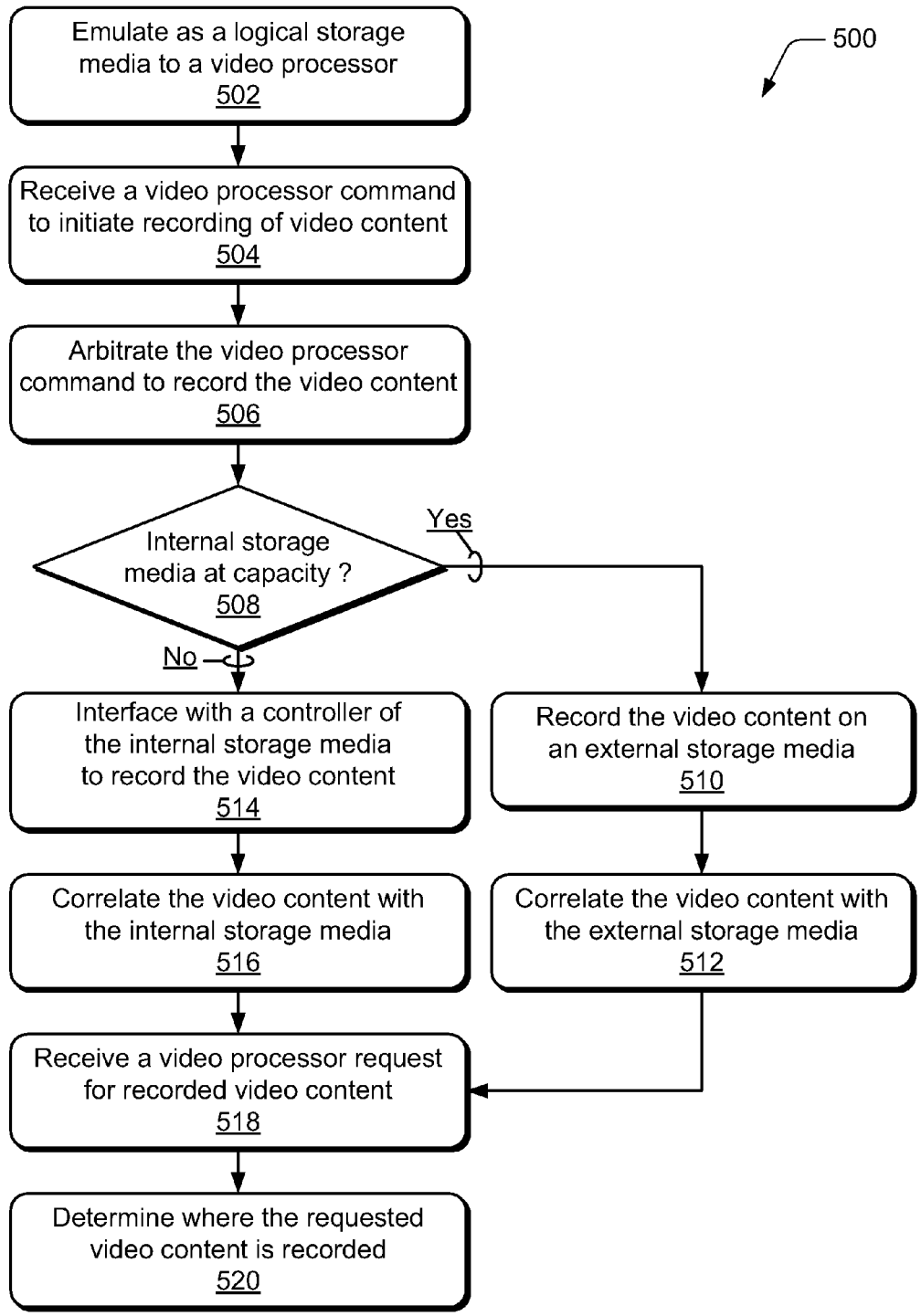
FIGS. 5-6 illustrate example methods of storage emulation control in accordance with one or more embodiments.

FIG. 5 illustrates example method(s) 500 of storage emulation control and is described with reference to a storage emulation controller. The order in which the method is described is not intended to be construed as a limitation, and any number of the described method blocks can be combined in any order to implement the method, or an alternate method.

At block 502, a logical storage media is emulated to a video processor of a video processing device. For example, the storage emulation controller 104 emulates a logical storage media to the video processor 106 of video processing device 100 (FIG. 1). In one or more embodiments, the logical storage media includes the internal storage media 110 and any number of external storage media of the video processing device, such as external storage media 112. The storage emulation controller 104 manages any number of external storage media devices that are networked to the video processing device 100, and emulates the external storage media devices as part of the logical storage media to the video processor 106 of the video processing device 100. In addition, the storage emulation controller 104 emulates the logical storage media to additional video processing devices that are networked with the video processing device, such as described with reference to FIG. 4.

At block 504, a video processor command is received to initiate recording of video content on the logical storage media and, at block 506, the video processor command is arbitrated to record the video content on the internal storage media or the external storage media. For example, storage emulation controller 104 receives a video processor command from the video processor 106 to initiate recording of video content 102 on the logical storage media, which the storage emulation controller 104 emulates. The storage emulation controller 104 then arbitrates the video processor command to record the video content on the internal storage media 110 or the external storage media 112.

At block 508, a determination is made as to whether the internal storage media is at capacity. For example, the storage emulation controller 104 determines whether the internal storage media 110 is at capacity. If the internal storage media is at capacity (i.e., "yes" from block 508), then the video content is recorded on the external storage media at block 510, and the video content is correlated with the external storage media at block 512. For example, the storage emulation controller 104 records the video content on the external storage media 112 when determining that the internal storage media 110 is at capacity. The storage emulation controller 104 also correlates the video content with the external storage media 112 when the video content is recorded, such as with the lookup table 320 (FIG. 3).

If the internal storage media is not at capacity (i.e., "no" from block 508), then a storage media controller of the internal storage media is interfaced to record the video content on the internal storage media at block 514, and the video content is correlated with the internal storage media at block 516. For example, the storage emulation controller 104 interfaces the storage media controller 108 and records the video content on the internal storage media 110 when determining that the internal storage media 110 is not at capacity. The storage emulation controller 104 also correlates the video content with the internal storage media 110 when the video content is recorded, such as with the lookup table 320.

At block 518, a video processor request is received for the video content that is recorded on the logical storage media and, at block 520, the requested video content is determined to be recorded on one of the internal storage media or the external storage media. For example, the storage emulation controller 104 receives a request for video content that is recorded on the logical storage media (e.g., the internal storage media 110 or the external storage media 112). The storage emulation controller 104 determines that the requested video content is recorded on the internal storage media 110 or the external storage media 112 from the lookup table 320 that correlates the recorded video content with the storage media on which it is recorded.

Figure 6:
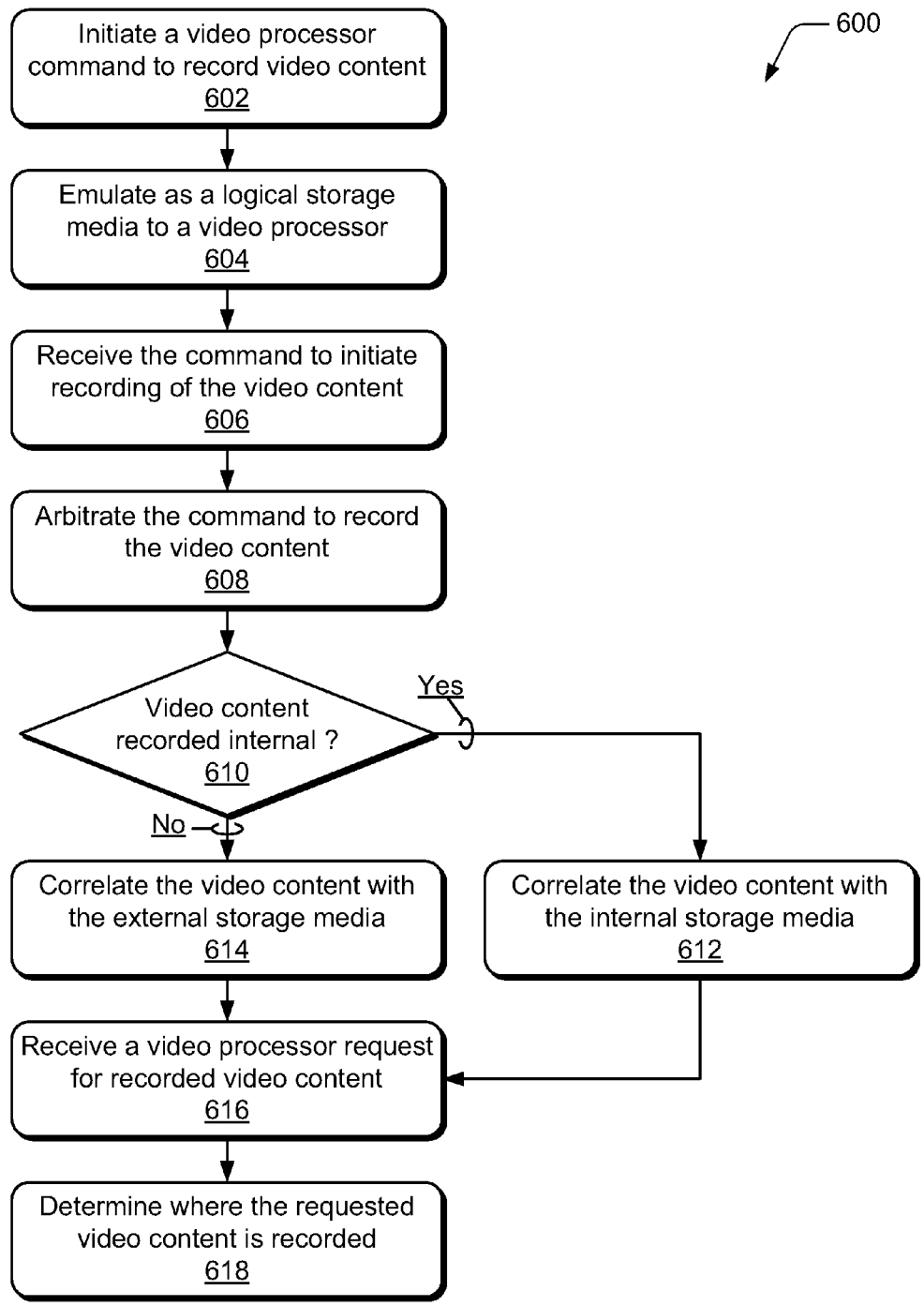

FIG. 6 illustrates example method(s) 600 of storage emulation control and is described with reference to an SoC that includes a storage emulation controller. The order in which the method is described is not intended to be construed as a limitation, and any number of the described method blocks can be combined in any order to implement the method, or an alternate method.

At block 602, a video processor command is initiated to record video content. For example, the video processor 214 of the storage emulation control system 210 that is integrated on SoC 200 (FIG. 2) initiates a video processor command to initiate recording of video content on a storage media.

At block 604, a logical storage media is emulated to a video processor. For example, the storage emulation controller 212 of the storage emulation control system 210 emulates a logical storage media to the video processor 214. In one or more embodiments, the logical storage media includes an internal storage media (e.g., internal to a video processing device that includes the SoC 200) and any number of external storage media (e.g., external to a video processing device that includes the SoC 200).

At block 606, the video processor command is received to initiate recording of the video content on the logical storage media and, at block 608, the video processor command is arbitrated to record the video content on an internal or external storage media of the logical storage media. For example, the storage emulation controller 212 receives the video processor command from the video processor 214 to initiate recording of the video content on the logical storage media. The storage emulation controller 212 then arbitrates the video processor command to record the video content.

At block 610, a determination is made as to whether the video content is recorded on an internal storage media. If the video content is recorded on an internal storage media (i.e., "yes" from block 610), then the video content is correlated with the internal storage media at block 612. For example, the storage emulation controller 212 records the video content on an internal storage media and correlates the video content with the internal storage media, such as in the lookup table 320 (FIG. 3).

If the video content is not recorded on an internal storage media (i.e., "no" from block 610), then the video content is correlated with the external storage media at block 614. For example, the storage emulation controller 212 records the video content on an external storage media and correlates the video content with the external storage media, such as in the lookup table 320.

At block 616, a video processor request is received for the video content that is recorded on the logical storage media and, at block 618, the requested video content is determined to be recorded on one of an internal storage media or an external storage media. For example, the storage emulation controller 212 receives a request for video content that is recorded on the logical storage media (e.g., an internal storage media or an external storage media). In an embodiment, the storage emulation controller 212 determines that the requested video content is recorded on the internal storage media or the external storage media from the lookup table 320 that correlates the recorded video content with the storage media on which it is recorded.

Figure 7:
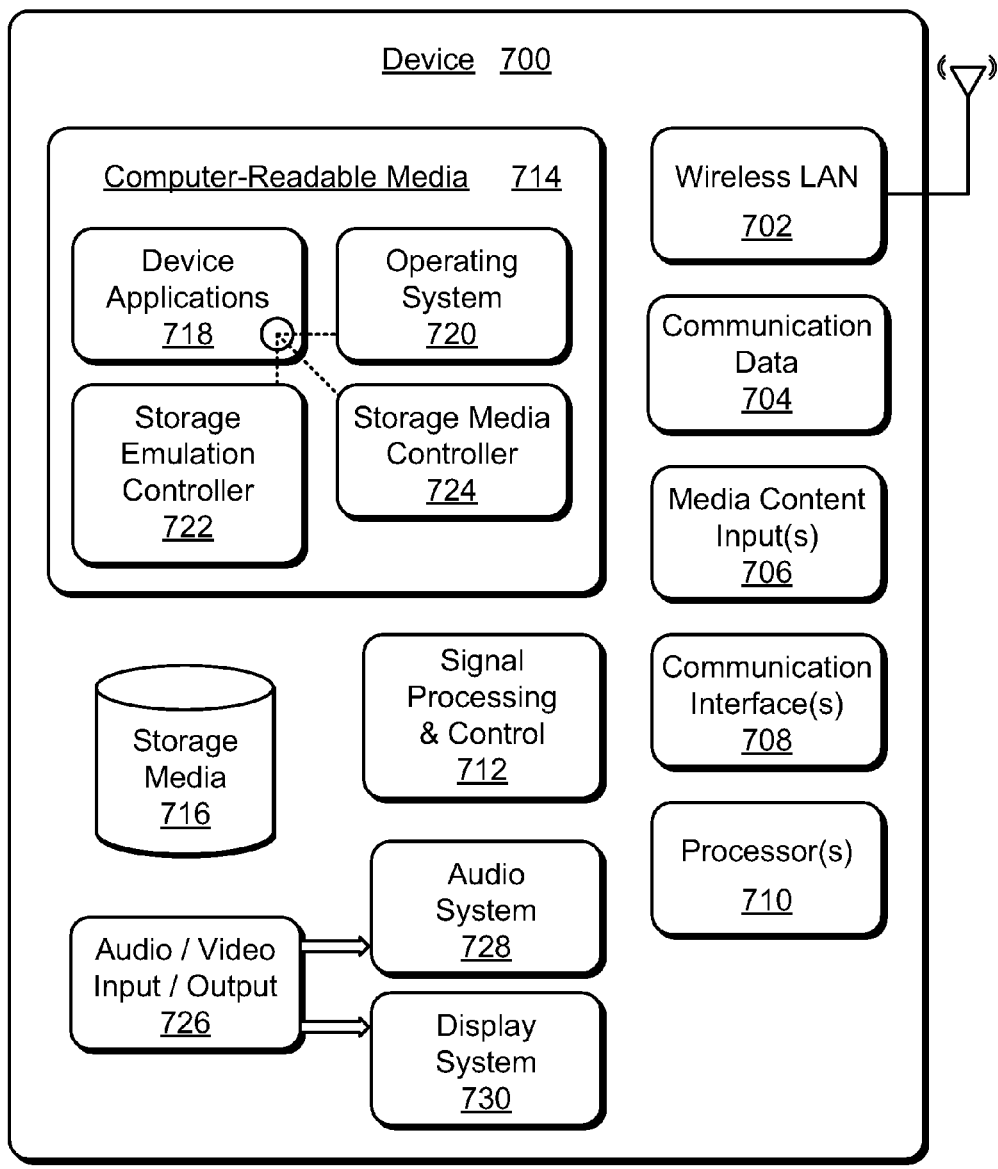
FIG. 7 illustrates various components of an example device that can implement embodiments of storage emulation control.

FIG. 7 illustrates various components of an example device 700 that can be implemented as any type of device that includes a storage emulation control system to implement various embodiments of storage emulation control. For example, device 700 can be implemented as the video processing device 100 shown in FIG. 1. In addition, device 700 can be implemented to include the system-on-chip (SoC) 200 shown in FIG. 2 and/or the storage emulation controller 300 shown in FIG. 3. In various embodiments, device 700 can be implemented as any one or combination of a media device, computer device, telephone (e.g., cellular, VoIP, Wi-Fi, etc.), high definition television (HDTV), television set-top box, video processing device, appliance device, gaming device, electronic device, digital camera, GPS navigation device, vehicle, workstation, access point, and/or as any other type of device. The device 700 may also be associated with a user (i.e., a person) and/or an entity that operates the device such that a device describes logical devices that include users, software, and/or a combination of devices.

Device 700 includes wireless LAN (WLAN) components 702, that enable wireless communication of communication data 704 (e.g., received communication data, communication data that is being received, communication data scheduled for broadcast, data packets of the communication data, etc.). Device 700 can also include one or more media content input(s) 706 via which any type of media content can be received, such as music, television media content, video content, and any other type of audio, video, and/or image media content received from a media content source that can be rendered and/or displayed for viewing.

Device 700 can also include communication interface(s) 708 that can be implemented as any one or more of a serial and/or parallel interface, a wireless interface, any type of network interface, a modem, and as any other type of communication interface. A wireless interface enables device 700 to receive control input commands and other data from an input device, such as from a remote control device, a portable computing-based device (such as a cellular phone), or from another infrared (IR) or similar RF input device.

Device 700 can also include one or more processor(s) 710 (e.g., any of microprocessors, controllers, and the like) which process various computer-executable instructions to control the operation of device 700, to communicate with other electronic and computing devices, and to implement embodiments of storage emulation control. Alternatively or in addition, device 700 can be implemented with any one or combination of hardware, firmware, or fixed logic circuitry that is implemented in connection with signal processing and control circuits which are generally identified at 712.

Device 700 can include computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the communication data 704, as well as various device applications 718 and any other types of information and/or data related to operational aspects of device 700. For example, an operating system 720 can be maintained as a computer application with the computer-readable media 714 and executed on processor(s) 710. In one or more embodiments, the device applications 718 can also include a storage emulation controller 722 and/or storage media controller 724 when device 700 is implemented to include a storage emulation control system. In this example, the device applications 718 are shown as software modules and/or computer applications that can implement various embodiments of storage emulation control.

Device 700 can also include an audio and/or video input/output system 726 that provides audio data to an audio rendering system 728 and/or provides video data to a display system 730. The audio rendering system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, audio rendering system 728 and/or the display system 730 can be implemented as external components to device 700. Alternatively, the audio rendering system 728 and/or the display system 730 can be implemented as integrated components of the example device 700.

Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Figure 8:
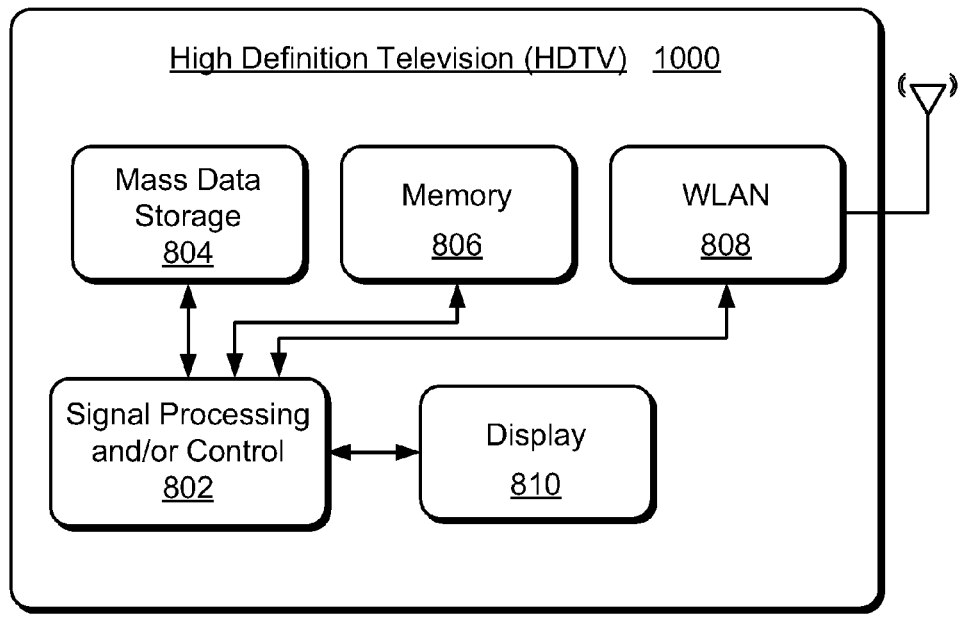
FIGS. 8-10 illustrate some examples of various devices that can each implement embodiments of storage emulation control.
Figure 9:
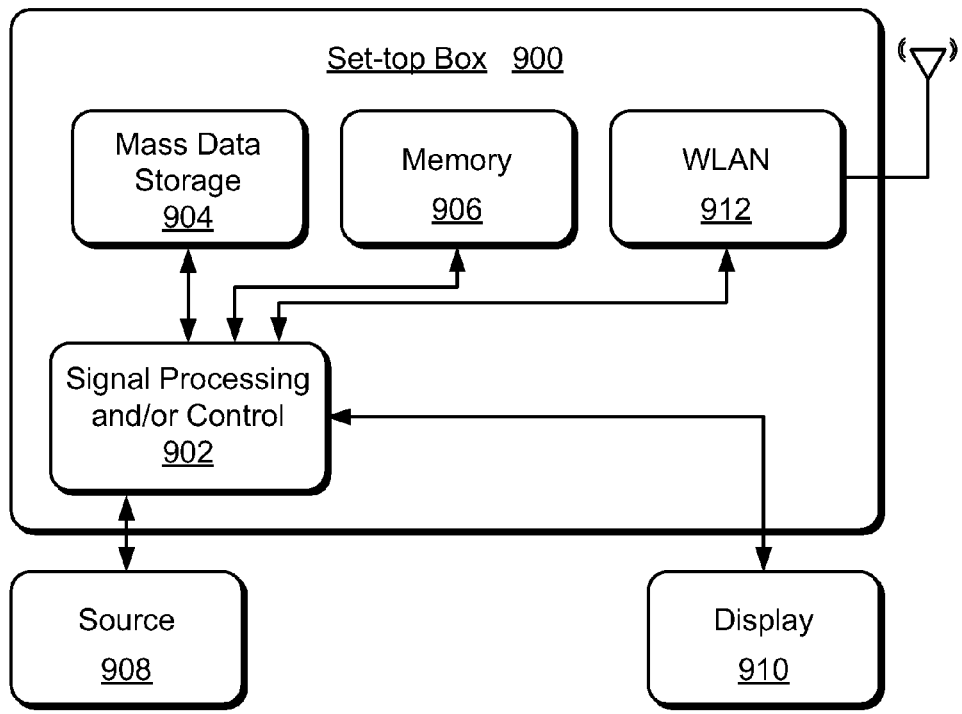
Figure 10:
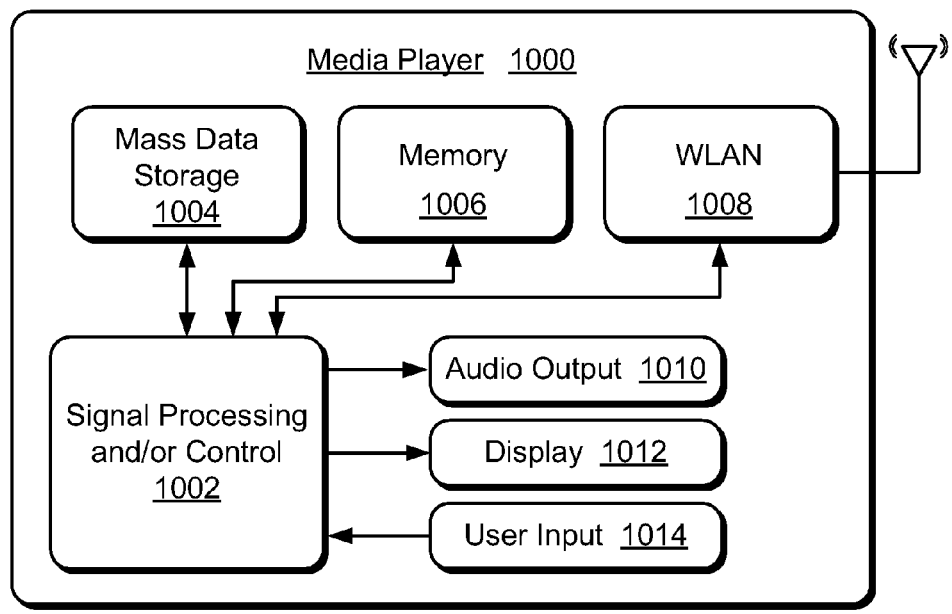

FIGS. 8-10 illustrate some examples of various devices that can each be implemented as any type of a device that includes a storage emulation control system to implement various embodiments of storage emulation control. For example, any of the various devices can be implemented to include the system-on-chip (SoC) 200 shown in FIG. 2 and/or the storage emulation controller 300 shown in FIG. 3.

FIG. 8 illustrates an example device that can be embodied as a high definition television (HDTV) 800, which includes signal processing and/or control circuit(s) generally identified at 802. The signal processing and/or control circuit(s) can be implemented as an SoC and include a storage emulation controller. The HDTV 800 can also include mass data storage 804 and/or a memory 806, such as random access memory (RAM), a low-latency nonvolatile memory (e.g., flash memory), read only memory (ROM), and/or other suitable electronic data storage. The mass data storage 804 can store data in a nonvolatile manner, and can include an optical storage media and/or a hard disk drive (HDD).

In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory 806. In addition, the HDTV 800 includes a wireless local area network (WLAN) interface 808 via which input signals can be received in either a wired or wireless format. HDTV output signals can be generated for a display 810.

FIG. 9 illustrates an example device that can be embodied as a television set-top box 900, which includes signal processing and/or control circuit(s) generally identified at 902. The signal processing and/or control circuit(s) can be implemented as an SoC and include a storage emulation controller. The set-top box 900 can also include mass data storage 904 and/or a memory 906, such as random access memory (RAM), a low-latency nonvolatile memory (e.g., flash memory), read only memory (ROM), and/or other suitable electronic data storage. The mass data storage 904 can store data in a nonvolatile manner, and can include an optical storage media and/or a hard disk drive (HDD).

The set top box 900 can receive data signals from a source 908, such as a broadband source, and can then output standard and/or high definition audio/video signals suitable for a display 910, such as a television, monitor, and/or other video and/or audio output devices. In various implementations, the signal processing and/or control circuit(s) 902 can be implemented to process data (e.g., any of encoding, decoding, encryption, and/or decryption), perform data calculations, format data, and/or any other signal processing functions associated with a television set-top box. The data can be output to and/or received from at least the memory 906 and/or the source 908. In addition, the set-top box 900 includes a wireless local area network (WLAN) interface 912 via which input signals can be received in either a wired or wireless format. The set-top box 900 can also support connections with a WLAN via the WLAN interface 912.

FIG. 10 illustrates an example device that can be embodied as a media player 1000, which includes signal processing and/or control circuit(s) generally identified at 1002. The signal processing and/or control circuit(s) can be implemented as an SoC and include a storage emulation controller. The media player 1000 can also include mass data storage 1004 and/or a memory 1006, such as random access memory (RAM), a low-latency nonvolatile memory (e.g., flash memory), read only memory (ROM), and/or other suitable electronic data storage. The mass data storage 1004 can store data, such as compressed audio and/or video content, in a nonvolatile manner. In some implementations, compressed audio files include files that are compliant with an MP3 format or other suitable compressed audio and/or video formats. The mass data storage 1004 can include an optical storage media and/or a hard disk drive (HDD).

In various implementations, the signal processing and/or control circuit(s) 1002 can be implemented to process data (e.g., any of encoding, decoding, encryption, and/or decryption), perform data calculations, format data, and/or any other signal processing functions associated with a media player. The data can be output to and/or received from at least the memory 1006. In addition, the media player 1000 includes a wireless local area network (WLAN) interface 1008 via which input signals can be received in either a wired or wireless format. The media player 1000 can also support connections with a WLAN via the WLAN interface 1008. In some implementations, the media player 1000 can include an audio output 1010 such as a speaker and/or audio output jack, a display 1012, and/or an input device 1014 such as a keypad, touchpad, pointing device, voice actuation, and/or other input device. In various implementations, media player 1000 can employ a graphical user interface (GUI) that typically includes menus, drop down menus, icons, and/or a point-and-click interface via display 1012 and/or user input 1014.

Although embodiments of storage emulation control have been described in language specific to features and/or methods, it is to be understood that the subject of the appended claims is not necessarily limited to the specific features or methods described. Rather, the specific features and methods are disclosed as example implementations of storage emulation control.

The invention claimed is:
1. A method, comprising:
emulating a logical storage media to a video processor of a first video processing device, the logical storage media including at least an internal storage media internal to the first video processing device and an external storage media external to the first video processing device, the external storage media including a networked internal storage media of a second video processing device networked to the first video processing device;

receiving a serial advanced technology attachment (SATA) command to initiate recording of video content on the logical storage media; and arbitrating the SATA command by decoding and changing control fields of the SATA command effective to cause the video content to be recorded on at least one of the internal storage media internal to the first video processing device or the networked internal storage media of the second video processing device.

2. A method as recited in claim 1, wherein the SATA command to initiate recording of video content on the logical storage media is received from the second video processing device.

3. A method as recited in claim 1, further comprising:
correlating the video content with the internal storage media if the video content is recorded on the internal storage media; and
correlating the video content with the networked internal storage media of the second video processing device if the video content is recorded on the networked internal storage media of the second video processing device.

4. A method as recited in claim 1, further comprising:
receiving a video processor request for the video content that is recorded on the logical storage media; and
determining whether the video content is recorded on one of the internal storage media or the networked internal storage media of the second video processing device.

5. A method as recited in claim 4, wherein the video processor request for the video content is received from the second video processing device and further comprising providing the video content to the second video processing device.

6. A method as recited in claim 1, wherein the first video processing device is a first television set-top box and the second video processing device is a second television set-top box.

7. A method as recited in claim 1, wherein one of the first video processing device or the second video processing device is a television set-top box and another of the first video processing device or the second video processing device is a high definition television.

8. A method as recited in claim 1, wherein one of the first video processing device or the second video processing device is a computing device and another of the first video processing device or the second video processing device is a high definition television.

9. A storage emulation control system, comprising:
a logical storage media that includes at least an internal storage media internal to a first video processing device in which the storage emulation control system is included and an external storage media external to the first video processing device, the external storage media including a networked internal storage media of a second video processing device networked to the first video processing device; and
a storage emulation controller configured to:
emulate the logical storage media to a video processor of the first video processing device;
receive, from the video processor, a serial advanced technology attachment (SATA) command to initiate recording of video content on the logical storage media; and
arbitrate the SATA command by decoding and changing control fields of the SATA command effective to cause the video content to be recorded on at least one of the internal storage media of the first video processing device or the networked internal storage media of the second video processing device.

10. A storage emulation control system as recited in claim 9, wherein the first video processing device and the second video processing device are networked using an Ethernet network.

11. A storage emulation control system as recited in claim 9, wherein the storage emulation controller is further configured to:
correlate the video content with the internal storage media if the video content is recorded on the internal storage media; and
correlate the video content with the networked internal storage media of the second video processing device if the video content is recorded on the networked internal storage media of the second video processing device.

12. A storage emulation control system as recited in claim 9, wherein the storage emulation controller is further configured to:
receive a video processor request for the video content that is recorded on the logical storage media; and
determine whether the video content is recorded on one of the internal storage media or the networked internal storage media of the second video processing device.

13. A storage emulation control system as recited in claim 9, wherein the storage emulation controller is further configured to interface with a storage media controller of the internal storage media to record the video content on the internal storage media.

14. A storage emulation control system as recited in claim 9, further comprising a system-on-chip (SoC) integrated to include at least the storage emulation controller and the video processor.

15. A video processing device, comprising:
an internal storage media configured to record video content;
a video processor configured to initiate a serial advanced technology attachment (SATA) command to record the video content on the internal storage media; and
a storage emulation controller configured to:
emulate a logical storage media to the video processor, the logical storage media including at least the internal storage media and an external storage media external to the video processing device, the external storage media including a networked internal storage media of another video processing device networked to the video processing device;
receive, from the video processor, the SATA command to initiate recording of the video content; and
arbitrate the SATA command by decoding and changing control fields of the SATA command effective to cause the video content to be recorded on at least one of the internal storage media or the networked internal storage media of the other video processing device.

16. A video processing device as recited in claim 15, wherein the storage emulation controller is further configured to determine whether the internal storage media is at capacity, and arbitrate the SATA command to record the video content on the networked internal storage media of the other video processing device based on the determination.

17. A video processing device as recited in claim 15, wherein the storage emulation controller is further configured to:
correlate the video content with the internal storage media if the video content is recorded on the internal storage media; and correlate the video content with the networked internal storage media of the other video processing device if the video content is recorded on the networked internal storage media of the other video processing device.

18. A video processing device as recited in claim 15, wherein the storage emulation controller is further configured to:
  receive a video processor request for the video content that is recorded on the logical storage media; and
  determine whether the video content is recorded on one of the internal storage media or the external storage media.

19. A video processing device as recited in claim 18, wherein the video processor request for the video content is received from the other video processing device and further comprising providing the video content to the other video processing device.

20. A video processing device as recited in claim 15, wherein the storage emulation controller is further configured to interface with a storage media controller of the internal storage media to record the video content on the internal storage media.

21. A video processing device as recited in claim 15, wherein the storage emulation controller is further configured to emulate the logical storage media to an additional video processing device that is networked with the video processing device.

22. One or more computer-readable media devices comprising computer-executable instructions that, when executed, implement a storage emulation controller to:
  emulate a logical storage media to a video processor of a first video processing device, the logical storage media including at least an internal storage media internal to the first video processing device and an external storage media external to the first video processing device, the external storage media including a networked internal storage media of a second video processing device networked to the first video processing device;
  receive a serial advanced technology attachment (SATA) command to initiate recording of video content on the logical storage media; and
  arbitrate the SATA command by decoding and changing control fields of the SATA command effective to cause the video content to be recorded on at least one of the internal storage media internal to the first video processing device or the networked internal storage media of the second video processing device.

23. One or more computer-readable media devices as recited in claim 22, further comprising computer-executable instructions that, when executed, implement the storage emulation controller to determine whether the internal storage media is at capacity, and arbitrate the SATA command to record the video content on the networked internal storage media of the second video processing device based on the determination.

24. One or more computer-readable media devices as recited in claim 22, further comprising computer-executable instructions that, when executed, implement the storage emulation controller to:
  emulate networked external storage media devices including the second video processing device as part of the logical storage media to the video processor of the video processing device;
  receive, from one of the networked external storage media devices, a video processor request for video content that is recorded on the logical storage media;
  determine whether the video content is recorded on the internal storage media or the networked internal storage media of the second video processing device or one or more of the other networked external storage media devices; and
  provide the video content to the one of the networked external storage media devices from the determined internal storage media or the networked internal storage media.

\* \* \* \* \*